(12) United States Patent
Takahashi et al.

(10) Patent No.: US 9,477,024 B2
(45) Date of Patent: Oct. 25, 2016

(54) POLARIZING ELEMENT, PROJECTOR AND METHOD OF MANUFACTURING POLARIZING ELEMENT

(71) Applicant: DEXERIALS CORPORATION, Tokyo (JP)

(72) Inventors: Eiji Takahashi, Miyagi (JP); Akio Takada, Miyagi (JP)

(73) Assignee: DEXERIALS CORPORATION, Tokyo (JP)

(*) Notice: Subject to any disclaimer, the term of this patent is extended or adjusted under 35 U.S.C. 154(b) by 330 days.

(21) Appl. No.: 13/975,805

(22) Filed: Aug. 26, 2013

(65) Prior Publication Data
US 2014/0063467 A1 Mar. 6, 2014

(30) Foreign Application Priority Data
Sep. 5, 2012 (JP) .................... 2012-195547

(51) Int. Cl.
*G02B 5/30* (2006.01)
*G02F 1/1335* (2006.01)

(52) U.S. Cl.
CPC . *G02B 5/3058* (2013.01); *G02F 2001/133548* (2013.01)

(58) Field of Classification Search
USPC ............ 359/483.01, 485.01, 485.05, 487.03; 349/96; 353/20
See application file for complete search history.

(56) References Cited

U.S. PATENT DOCUMENTS

| 2008/0316599 | A1* | 12/2008 | Wang | G02B 5/3058 359/485.05 |
| 2011/0170187 | A1* | 7/2011 | Sawaki | G02B 5/3058 359/485.03 |
| 2012/0105745 | A1* | 5/2012 | Kumai | G02B 5/3058 349/5 |
| 2012/0206676 | A1* | 8/2012 | Chung | G02F 1/133516 349/97 |
| 2012/0206677 | A1* | 8/2012 | Chung | G02F 1/133516 349/97 |
| 2012/0206678 | A1* | 8/2012 | Kim | G02F 1/133516 349/106 |

\* cited by examiner

*Primary Examiner* — Derek S Chapel
(74) *Attorney, Agent, or Firm* — Oliff PLC

(57) ABSTRACT

A polarizing element includes a transparent substrate, a reflective layer constituting, on the transparent substrate, grid-shaped convexities arrayed at a pitch smaller than a wavelength in a used optical bandwidth, a dielectric layer formed on the reflective layer, a diffusion barrier layer formed on the dielectric layer, and an absorbing layer formed on the diffusion barrier layer such that the diffusion barrier layer is sandwiched between the absorbing layer and the dielectric layer. This polarizing element has an excellent optical property and is able to prevent mixing of the absorbing layer and the dielectric layer under a high temperature.

16 Claims, 14 Drawing Sheets

|  | Si | W | Nb | Ta | Ti |
|---|---|---|---|---|---|
| refractive index n | 4.28 | 3.5 | 2.93 | 2.77 | 1.88 |
| extinction coefficient k | 1.02 | 2.74 | 2.87 | 3.41 | 2.6 |

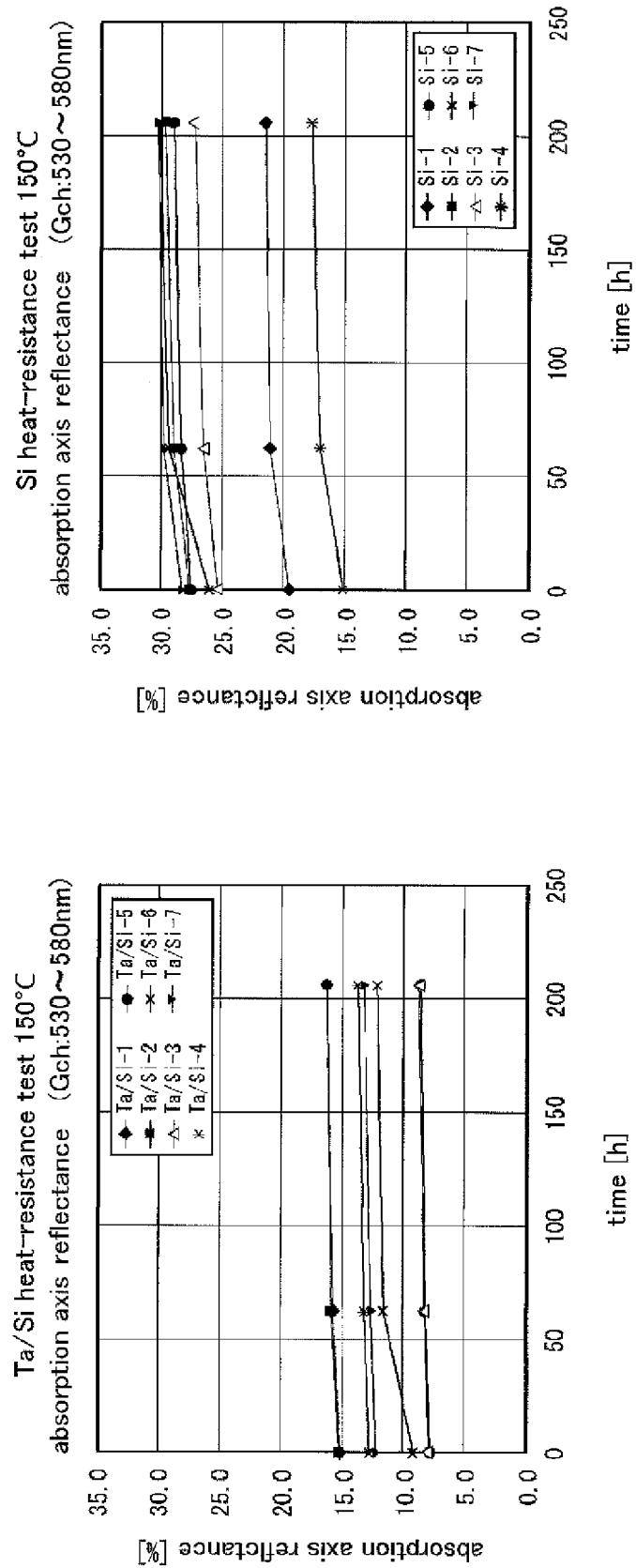

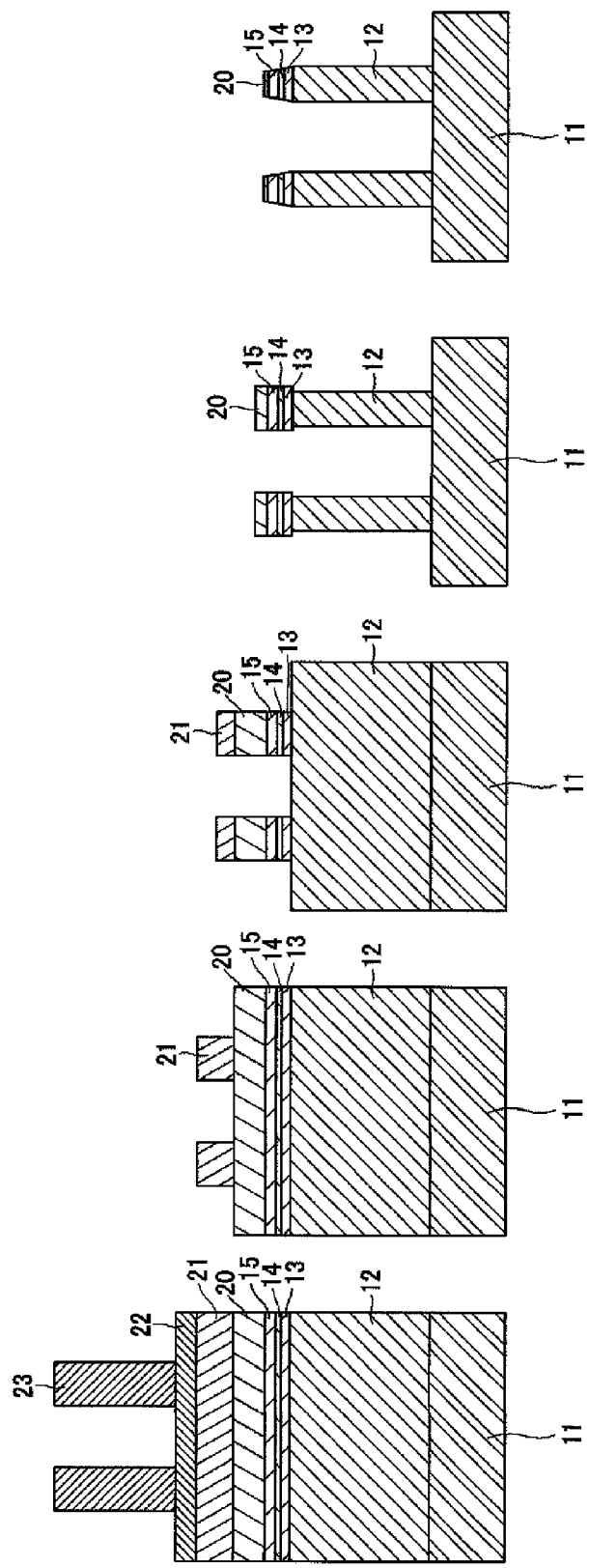

POLARIZING ELEMENT, PROJECTOR AND METHOD OF MANUFACTURING POLARIZING ELEMENT

BACKGROUND OF THE INVENTION

1. Field of the Invention

This invention relates to a polarizing element for absorbing one of mutually orthogonal polarized components (P-polarized wave and S-polarized wave) and transmitting the other.

2. Description of the Related Art

The image formation principle of liquid crystal display devices essentially requires polarizing elements provided on a surface of a liquid crystal panel. The function of the polarizing elements is to absorb one of mutually orthogonal polarized components (P-polarized wave and S-polarized wave) and to transmit the other.

Dichroic polarizing plates containing iodine or dye type organic polymer materials in films have been widely used as this kind of polarizing elements. These polarizing elements are generally manufactured by using a method including steps of dyeing a polyvinyl alcohol film with dichroic material such as iodine, performing crosslinking with a crosslinking agent and then performing uniaxial stretching. The dichroic polarizing plates tend to shrink since the manufacturing process includes this stretching step. In addition, because the polyvinyl alcohol film employs hydrophilic polymer, it is highly deformable especially under humidified conditions. Moreover, using a film as a base result in insufficient mechanical strength of the device, which may require a transparent protective film glued thereto.

In recent years, the liquid crystal display devices have been widely used in many purposes and the functionalities of them have been sophisticated. Accordingly, high reliability and durability are required on each device constituting the liquid crystal display devices. For example, in the case of liquid crystal display devices using a light source with a large luminous energy such as transmissive liquid crystal projectors, polarizing plates are exposed to intensive radiant rays. Consequently, the polarizing plates used for these are required to have an excellent heat-resisting property. However, since the above described film-based polarizing plates are made of organic materials, a limitation exists in enhancement of the property.

An inorganic polarizing plate having an excellent heat-resisting property is commercially available from Corning Incorporated in the USA under the trade name of "Polarcor". This polarizing plate has a structure in which silver particles are diffused into glass and uses no organic material such as a film. The principle of this utilizes plasma resonance absorption of island particles. Particularly, it utilizes light absorption by surface plasma resonance occurring when light enters into the island particles of precious metals or transition metals and the absorption wavelength depends on the shapes of the particles and the permittivity therearound. Using elliptical-shaped island particles can differentiate the resonance wavelengths in major and minor axis directions, thereby achieving a polarizing property. In particular, they absorb polarized components parallel to the major axis and transmit polarized components parallel to the minor axis in long wavelength range. However, the Polarcor, which only polarizes lights in the wavelength range near infrared region, does not cover visible light range required in liquid crystal displays. This is due to the physical property of silver used for the island particles.

Patent literature (PTL) 1 discloses a UV polarizing plate using silver as metal particles, wherein the particles are educed in glass by heat reduction to apply the above described principle. In this case, it is suggested that absorption in minor axis is utilized in contrast to the above mentioned Polarcor. Although FIG. 1 of PTL 1 shows a function as a polarizing plate near 400 nm, the extinction ratio is small and the absorbable wavelength rage is extremely narrow such that the polarizing plate cannot cover the entire visible light range even if Polarcor and the technologies of PTL 1 are combined.

Non patent literature (NPL) 1 theoretically analyzes inorganic polarizing plates using plasma resonance of metal island particles. This literature describes that resonance wavelength of aluminum particles is approximately 200 nm shorter than that of silver particles, so that a polarizing plate covering visible light range can possibly be manufactured by using aluminum particles.

NPL 2 discloses some methods of manufacturing a polarizing plate by using aluminum particles. According to this literature, silicate-based glasses are not preferable for the substrate since aluminum reacts with the glasses and calcium aluminoborate glasses are suitable for this purpose (paragraphs 0018 and 0019). This limitation is at an economic disadvantage since the silicate-based glasses are widely spread as optical glasses and reliable products of them can be obtained at low cost. The literature also describes a method for forming island particles by etching a resist pattern (paragraphs 0037 and 0038). In general, a polarizing plate used in a projector is required to have a size of several centimeters and a high extinction ratio. Consequently, in the case of a polarizing plate for visible light, the resist pattern should have a size of several tens nanometers in order to be sufficiently shorter than visible light wavelengths and the high extinction ratio requires a high density pattern. Moreover, when used in a projector, a large area is required. In the described method of forming a high-density micro pattern by lithography, however, electron beam drawing technology and the like should be used to obtain the above-described pattern. The electron beam drawing technology, which draws respective patterns by electron beam, is not practical due to the low productivity thereof.

Although PTL 2 describes that aluminum are removed with chlorine plasma, in this case, chloride is likely to adhere to the aluminum pattern etched in such a manner. It can be removed with a commercially available wet etchant (for example, SST-A2 available from Tokyo Ohka Kogyo Co., Ltd. in Japan); however, the etchant of this kind reacting with aluminum chloride also reacts with aluminum with a lower etching rate, making it difficult to form a desired pattern by using the described method.

In addition, PTL 2 also describes another method in which aluminum is deposited on a photo resist by glancing angle deposition (GLDA) and then the photo resist is removed (paragraphs 0045 and 0047). In this kind of method, it is contemplated that aluminum must be deposited also on the substrate surface in a certain extent to obtain an adhesion between the substrate and the aluminum. This means, however, the shape of the deposited aluminum film will differ from prolate sphere including prolate spheroid described as a suitable shape in paragraph 0015. As described in paragraph 0047, over-deposited materials are removed by anisotropic etching perpendicular to the surface. The shape anisotropy of aluminum is essential for the function of the polarizing plate. It therefore seems to be necessary that the amounts of aluminum deposited on resist part and substrate surface should be adjusted in order to obtain a desired shape by etching; however, controlling these in a size less than sub-micron size, such as 0.05 µm as described in paragraph 0047 is extremely difficult. Consequently, the productivity of this manufacturing method is suspicious. In addition, although the polarizing plate is required to have a property of a high transmittance in transmission axis direction, in the case of glass substrate, reflection of several percent from the glass interface is usually unavoidable, making it difficult to obtain the high transmittance.

PTL 3 discloses a method of forming a polarizing plate by glancing angle deposition (GLDA). This method, which obtains a polarizing property by forming micro-prismatic structures by glancing angle deposition of materials transparent and opaque to wavelengths in used bandwidth, seems to have a high productivity since micro patterns can be obtained by a process easier than the process explained in PTL 1. It should be noted that, the aspect ratio of the micro-prismatic structures of the material opaque to wavelengths in used bandwidth, the distance between each micro-prismatic structure and the linearity of the micro-prismatic structures are essential parameters for obtaining an excellent polarizing property and these parameters should be intentionally controlled also from a view point of property reproducibility; however, intentionally controlling these parameters is difficult since this method utilizes a phenomenon in which initial deposition layer of vapor particles blocks the subsequent vapor particles so that the prismatic structures are obtained by the lack of deposition of the vapor particles due to this shading. For dealing this problem, described is a method of providing polishing traces on a substrate by a rubbing process before the vapor deposition. Since the particle diameter of the vapored film is at most several tens nanometers, pitches less than sub-micron size should be intentionally produced by polishing in order to control the anisotropy of the particles. Unfortunately, ordinary polishing sheets, having a limitation of sub-microns, cannot easily produce such microscopic polishing traces. Furthermore, although the resonance wavelength of Al particles strongly depends on the refractive index therearound and how to combine the transparent and opaque materials is important in this case, no combination is disclosed in PTL 3 for obtaining an excellent polarizing property in visible light range. In addition, similarly to the case of PTL 1, when using a glass for the substrate, reflection of several percent from the glass interface is unavoidable.

NPL 2 discloses a polarizing plate named Lamipol for infrared communication. This has a laminated structure of Al and $SiO_2$ and, according to this literature, has an extremely high extinction ratio. NPL 3 describes that using Ge instead of Al, which is light absorbing part of Lamipol, can achieve a high extinction ratio at wavelengths less than 1 µm. Te (tellurium) is also expected to achieve a high extinction ratio, according to FIG. 3 of the NPL 3. Although Lamipol is an absorbing typed polarizing plate achieving a high extinction ratio as described above, since the size of the light receiving surface is the lamination thickness of the light absorbing and transmitting materials, Lamipol is not suitable for use in projectors requiring the size of several centimeters square.

PTL 4 describes a structure and property of an inorganic polarizing plate wherein a dielectric layer and inorganic micro particle layer are deposited on a metal grid and shows a high contrast can be obtained by this structure. It is supposed that further evolution of this structure can provide an inorganic polarizing plate having an increased contrast and a reduced reflection ratio and capable of being manufactured by a simple process, which will be more valuable for industrial purposes.

Unfortunately, the technology of PTL 4 hardly dissipates the heat converted by light absorption because the inorganic micro particle layer absorbing light is located at an air interface so that the temperature of the polarizing plate tends to increase due to the heat absorption. For this reason, it has a low light-fastness against strong light. A structure in which a reflection protecting layer added just under a reflective layer is described in paragraph [0083]. In this case, the upper inorganic micro particle layer might not be necessary depending on usage.

CITATION LIST

Patent Literatures

PTL 1: U.S. Pat. No. 6,772,608
PTL 2: Japanese Unexamined Patent Publication No. 2000-147253
PTL 3: Japanese Unexamined Patent Publication No. 2002-372620
PTL 4: Japanese Unexamined Patent Publication No. 2008-216957

Non Patent Literatures

NPL 1: J. Opt. Soc. Am. A Vol. 8, No. 4 619-624
NPL 2: Applied Optics Vol. 25 No. 2 1986 311-314
NPL 3: J. Lightwave Tec. Vol. 15 No. 6 1997 1042-1050

It is desirable for the polarizing element to have a high thermostability since the polarized light is absorbed at the shielded side thereof and converted into a heat in the polarizing plate. Unfortunately, in the polarizing elements of the inventions disclosed in the above described patent literatures, heat applied to the absorbing layer diffuses into the dielectric layer side, degrading the property of the polarizing elements. Particularly, in the case of using Si for the absorbing layer and $SiO_2$ for the dielectric layer, high temperature might cause the absorbing layer to diffuse into the dielectric layer, resulting in a mixing of both layers and thus degrading the optical property of the polarizing element.

Having regard to the above, an object of the present invention is to provide a polarizing element having an excellent optical property and capable of preventing the mixing of the absorbing layer and the dielectric layer under a high temperature, a projector using this polarizing element and a method of manufacturing a polarizing element.

SUMMARY OF THE INVENTION

To solve the above-mentioned problems, a polarizing element according to an aspect of the present invention comprises a transparent substrate, a reflective layer constituting, on the transparent substrate, grid-shaped convexities arrayed at a pitch smaller than a wavelength in a used optical bandwidth, a dielectric layer formed on the reflective layer, a diffusion barrier layer formed on the dielectric layer, and an absorbing layer formed on the diffusion barrier layer such that the diffusion barrier layer is sandwiched between the absorbing layer and the dielectric layer.

A projector according to an aspect of the present invention comprises the above-described polarizing element, a light source, and an image display panel, wherein the polarizing element receives light in a used optical bandwidth from the light source at a side of the transparent substrate on which the grid-shaped convexities are formed and transmits the light.

A method of manufacturing a polarizing element according to an aspect of the present invention, comprises steps of preparing a transparent substrate, forming a reflective layer on the substrate, forming a dielectric layer on the reflective layer, forming a diffusion barrier layer on the dielectric layer, forming an absorbing layer on the diffusion barrier layer, and forming a wire grid arrayed at a pitch smaller than a wavelength in a used optical bandwidth by patterning at least one of the laminated reflective layer, the dielectric layer, the diffusion barrier layer and the absorbing layer.

The present invention provides a polarizing element having a desirable extinction ratio in the visible light region. Furthermore, in contrast to inorganic polarizing plates having conventional structures, the present invention includes a diffusion barrier layer capable of suppressing thermal degradation, thereby improving heat-resisting property of the polarizing plate. Accordingly, the present invention provides a polarizing element having an improved reliability with a high light-fastness against strong light such as a light used in a liquid crystal projector. A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIGS. 14A and 14B shows transition of absorption axis reflectances over time in a heat-resistance test at 150° C. of a practical example and a comparative example, respectively;

FIGS. 15A to 15E are cross sectional views illustrating an etching process of a polarizing element according to the present invention;

DESCRIPTION OF THE PREFERRED EMBODIMENTS

Figure 1:
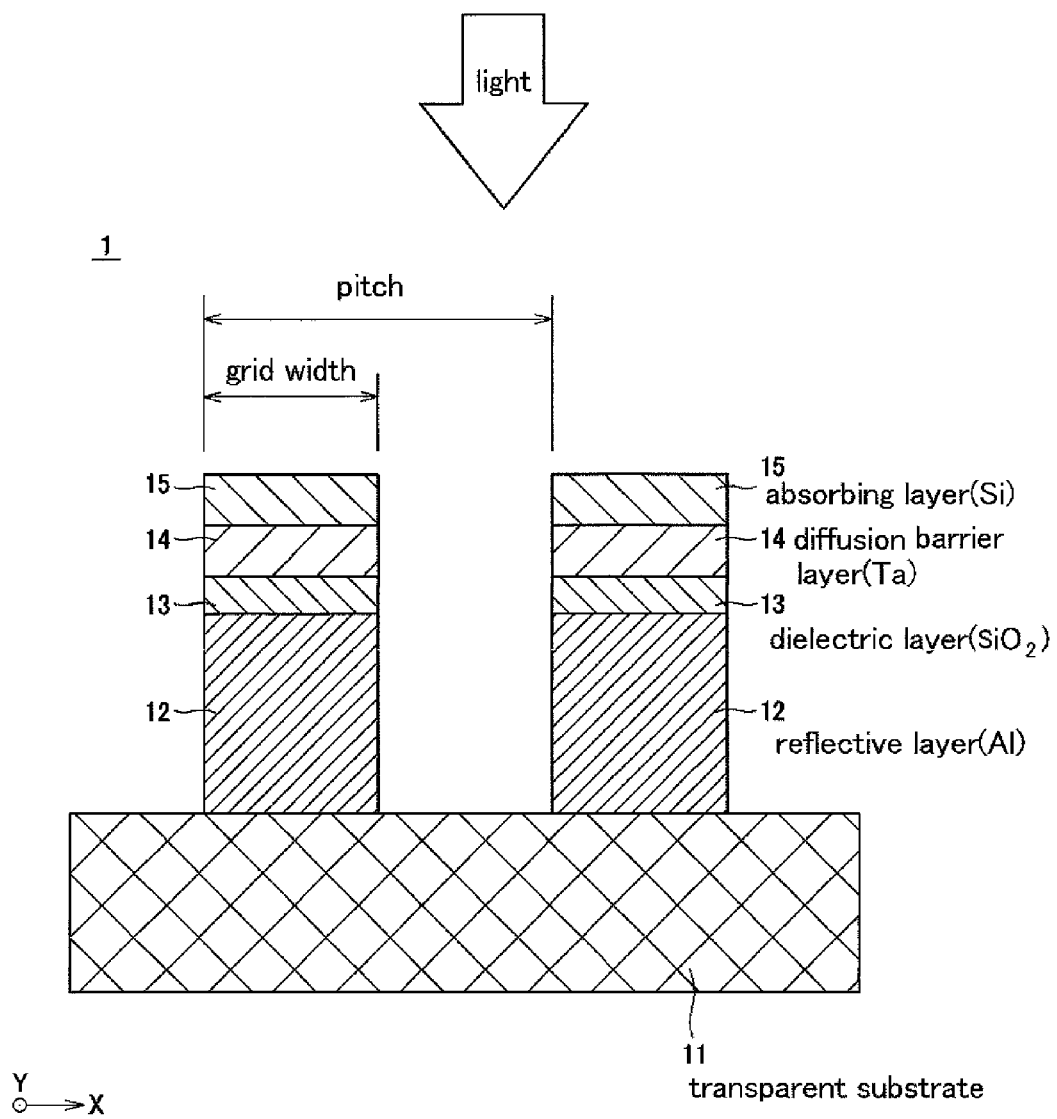
FIG. 1 is a cross sectional view of a polarizing element according to an embodiment of the present invention.

A polarizing element, a projector and a method of manufacturing a polarizing element according to the present invention will now be more particularly described with reference to the accompanying drawings according to the following order. It should be noted that the present invention is not limited to the embodiments described below and various modifications can be added to the embodiment without departing from the scope of the present invention. The features shown in the drawings are illustrated schematically and are not intended to be drawn to scale. Actual dimensions should be determined in consideration of the following description. Moreover, dimensional relations and proportions may be different among the drawings in some parts.

1. Constitution of a Polarizing Element
2. Evaluation Test of Optical Property
3. Manufacturing Method of a Polarizing Element
4. Exemplary Constitution of a Liquid Crystal Projector
1. Constitution of a Polarizing Element FIG. 1 is a schematic cross sectional view of a polarizing element according to an embodiment of the present invention. As shown in FIG. 1, a polarizing element 1 comprises a transparent substrate 11 that is transparent to a used optical bandwidth, a reflective layer 12 constituting, on the transparent substrate 11, grid-shaped convexities arrayed at a pitch smaller than a wavelength in the used optical bandwidth, a dielectric layer 13 formed on the reflective layer 12, a diffusion barrier layer 14 formed on the dielectric layer 13 and an absorbing layer 15 formed on the diffusion barrier layer 14. That is, the polarizing element 1 has a one-dimensional lattice shaped wire-grid structure in which convexities formed by layering the reflective layer 12, the dielectric layer 13, the diffusion barrier layer 14 and the absorbing layer 15 in this order from the transparent substrate 11 are arranged with a regular interval on the transparent substrate 11.

Figure 2:
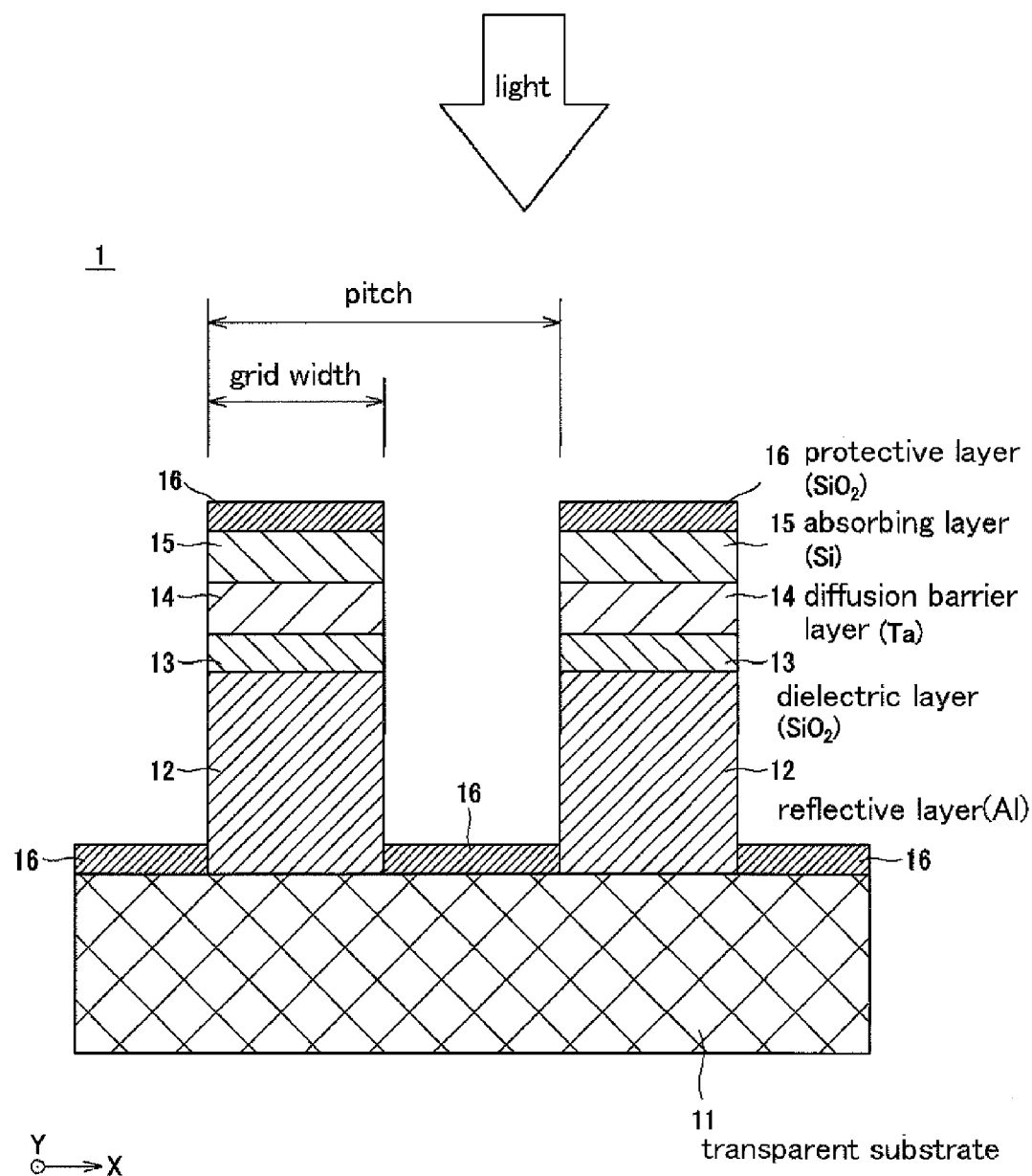
FIG. 2 is a cross sectional view of a polarizing element according to another embodiment of the present invention.

The absorbing layer 15 and the diffusion barrier layer 14 are formed of one or more types of materials including metals and semiconductors having light absorbing property wherein extinction coefficient of optical constant is not equal to zero. The polarizing element 1 is characterized by having the diffusion barrier layer 14 positioned between the dielectric layer 13 and the absorbing layer 15 in order to prevent diffusion of the absorbing layer 15. As shown in FIG. 2, it is possible to deposit a protective film 16, if necessary, such as a $SiO_2$ film on the top portion for improving reliability such as moisture resistance as long as the change of the optical property has no effect on practical use.

The polarizing element 1 in this constitution can attenuate the polarized wave having an electric field component parallel to the grid of the reflective layer 12 (TE wave (S-polarized wave)) and transmit the polarized wave having an electric field component perpendicular to the grid (TM wave (P-polarized wave)) by utilizing four activities of transmission, reflection, interference and selective light absorption of the polarized waves.

In other words, TE wave is attenuated by the selective light absorbing effect of the absorbing layer 15 and the diffusion barrier layer 14. The grid-shaped reflective layer 12 functions as a wire grid to reflect TE wave transmitted through the absorbing layer 15, the diffusion barrier layer 14 and the dielectric layer 13. By appropriately adjusting the thickness and refractive index of the dielectric layer 13, one part of the TE wave reflected by the reflective layer 12 is absorbed during the transmission through the absorbing layer 15 and the diffusion barrier layer 14 and the other part is reflected back to the reflective layer 12. The light transmitted through the absorbing layer 15 and the diffusion barrier layer 14 is attenuated by interference. The polarizing element 1 provides a desired polarizing property by this selective attenuation of TE wave.

Transparent Substrate

The transparent substrate 11 is formed of a material transparent to the light in the used optical bandwidth and having a refractive index of 1.1 to 2.2, such as glass, sapphire and quartz crystal. In this embodiment, it is preferable to employ quartz crystal or sapphire having a high thermal conductivity as the material to form the transparent substrate 11. This achieves a high light-fastness against strong light, thereby realizing a polarizing element suitable for use in an optical engine of a projector that produces large amount of heat.

In the case that the transparent substrate 11 is formed of an optically active crystal such as crystal quartz, excellent optical properties can be obtained by arranging the grid-shaped convexities in parallel or perpendicular direction relative to the optical axis of the crystal. The "optical axis" used herein means a directional axis that minimizes the difference between refractive indices of ordinary ray (O) and extraordinary ray (E) of the light travelling along the direction thereof.

It should be noted that, depending on the application of the polarizing element, glass, particularly quartz (refractive index of 1.46) or soda-lime glass (refractive index of 1.51) may be used. Since the component composition of the glass material has no special limitation, inexpensive glass materials such as silicate glass can be used and thus producing cost can be reduced.

Reflective Layer

The reflective layer 12 is formed on the transparent substrate 11 by arranging belt-shaped metal films extending in Y direction, which is the absorption axis. That is, the reflective layer 12 has a function as a wire grid polarizer that attenuates the polarized wave having an electric field component parallel to the longitudinal direction (Y-axis direction) of the wire grid (TE wave (S-polarized wave)) of the light entered from the transparent substrate 11 and transmits the polarized wave having an electric field component perpendicular to the longitudinal direction (X-axis direction) of the wire grid (TM wave (P-polarized wave)).

The material constituting the reflective layer 12 is not specially limited as long as it reflects the light in the used bandwidth; for example, simple substances such as Al, Ag, Cu, Mo, Cr, Ti, Ni, W, Fe, Si, Ge and Te, alloys of these substances and semiconductor materials may be used. Instead of metal materials, it can be constituted by inorganic film other than metal or resin film formed to have a surface with a high reflectance by coloring, for example.

Furthermore, reducing the width in transmission axis direction (X-axis direction) of the reflective layer 12 relative to the other layers (the dielectric layer 13, the diffusion barrier layer 14 and the absorbing layer 15) can increase transmission axis transmittance. Consequently, the transmittance of the polarizing element can be increased by optimally designing the pitch and width of the grid. Particularly, the width in transmission axis of the reflective layer 12 is preferably equal to or more than 50% of the grid (the dielectric layer 13, the diffusion barrier layer 14 and the absorbing layer 15) width, and more preferably, equal to or more than 80% of the grid width. The width (in X-axis direction) of the reflective layer 12 less than 50% of the grid width degrades thermal conductivity and physical strength.

Dielectric Layer

The dielectric layer 13 is formed to have a film thickness that shifts a phase of a polarized light transmitted through the absorbing layer 15 and reflected at the reflective layer 12 by a half wavelength relative to a polarized light reflected at the absorbing layer 15. Actual film thickness is appropriately determined within the range of 1 to 500 nm capable of adjusting the phase of the polarized light to enhance the interference effect. In the present embodiment, since the absorbing layer 15 absorbs the reflected light, the contrast will be improved without optimizing the film thickness, so that it may be practically determined by balancing a desired polarizing property and an actual manufacturing process.

The dielectric layer 13 may be formed of a common material including $SiO_2$, metal oxide such as $Al_2O_3$, beryllium oxide and bismuth oxide, $MgF_2$, cryolite, germanium, titanium dioxide, silicon, magnesium fluoride, boron nitride, boron oxide, tantalum oxide, carbon and any combination thereof. The refractive index of the dielectric layer 13 is preferably in the range of 1.0 to 2.5. The property of the polarizing element may be controlled by the material of the dielectric layer 13 since the optical property of the reflective layer 12 is also affected by the refractive index therearound.

Diffusion Barrier Layer

The diffusion barrier layer 14 is formed of a material capable of preventing diffusion of the absorbing layer 15 at the interface between the absorbing layer 15 and the diffusion barrier layer 14 or a material in which a substance produced by the diffusion will hardly affects the optical properties (transmittance and reflectance) of the polarizing element. In the case that the absorbing layer 15 is formed of Si, preferable material for forming the diffusion barrier layer 14 includes metal films such as Ta, W, Nb and Ti.

The material of the diffusion barrier layer 14 is preferably has a coefficient of thermal expansion similar to that of the material constituting the absorbing layer 15 described below for adhesion with the absorbing layer 15. For example, in the case that the absorbing layer 15 is formed of Si, it is preferable to form the diffusion barrier layer 14 by using W (coefficient of thermal expansion: $4.5 \times 10^{-6}$/K), Nb (coefficient of thermal expansion: $7.3 \times 10^{-6}$/K) and Ta (coefficient of thermal expansion: $6.3 \times 10^{-6}$/K) having a coefficient of thermal expansion similar to that of Si (coefficient of thermal expansion: $2.6 \times 10^{-6}$/K).

Providing the diffusion barrier layer 14 in the polarizing element 1 can prevent diffusion of the absorbing layer 15 and degradation of the optical properties otherwise caused by the diffusion, thereby improving heat-resisting property of the polarizing element 1 during an annealing process and practical use.

Absorbing Layer

The absorbing layer 15 is formed of one or more types of metals or semiconductors having light absorbing property wherein extinction coefficient of optical constant is not equal to zero, the selection of the materials depending on wavelength range of the light applied. Examples of metal materials include simple substances such as Ta, Al, Ag, Cu, Au, Mo, Cr, Ti, W, Ni, Fe and Sn, and alloys of these substances. Examples of semiconductor materials include Si, Ge, Te, ZnO and silicide materials ($\beta$-$FeSi_2$, $MgSi_2$, $NiSi_2$, $BaSi_2$, $CrSi_2$, $COSi_2$ and TaSi). By this configuration, the polarizing element 1 can have a desirable extinction ratio in the used visible light region.

In the case of a semiconductor material, band gap energy of the semiconductor must be below the used optical bandwidth, since the band gap energy affects the absorption effect. For example, when used with visible light, a material absorbing wavelengths of equal to or longer than 400 nm, therefore having a band gap of below 3.1 eV must be used.

It should be noted that the absorbing layer 15 may be formed of a high-density film by means of vapor deposition or spattering. In addition, the absorbing layer 15 may be composed of more than one layers.

The polarizing element 1 may include a protective film 16 that covers the transparent substrate 11 and grid-shaped convexities as shown in FIG. 2. The protective film 16, formed by depositing $SiO_2$, for example, can improve reliability such as moisture resistance. The protective film 16 is preferably formed by plasma chemical vapor deposition (CVD). The plasma CVD can deposit the protective film also in the gaps between the grid-shaped convexities.

The polarizing element 1 in this constitution can attenuate the polarized wave having an electric field component parallel to the grid of the reflective layer 12 (TE wave (S-polarized wave)) and transmit the polarized wave having an electric field component perpendicular to the grid of the reflective layer 12 (TM wave (P-polarized wave)) by utilizing four activities of transmission, reflection, interference and selective light absorption of the polarized waves. In other words, TE wave is attenuated by the selective light absorbing effect of the absorbing layer 15 and diffusion barrier layer 14, and TE wave transmitted through the absorbing layer 15, diffusion barrier layer 14 and the dielectric layer 13 is reflected by the grid-shaped reflective layer 12 that functions as a wire grid. By appropriately adjusting the thickness and refractive index of the dielectric layer 13, a part of the TE wave reflected by the reflective layer 12 and being transmitted through the absorbing layer 15 can be reflected back to the reflective layer 12, and the light transmitted through the absorbing layer 15 can be attenuated by interference. A desired polarizing property can be obtained by this selective attenuation of TE wave.

In the polarizing element 1 according to the present invention, the diffusion barrier layer 14 is positioned between the absorbing layer 15 and the dielectric layer 13. Consequently, even in the case that annealing is conducted during manufacturing process or that the polarizing element 1 is exposed to a high temperature in an actual usage, the polarizing element 1 can prevent the mixing of the absorbing layer 15 and the dielectric layer 13 to prevent degradation of the optical property thereof. In other words, when compared with inorganic polarizing plates having conventional structures, the polarizing element 1 of the present invention can suppress thermal degradation by the diffusion barrier layer 14, thereby improving heat-resisting property against a heat generated by a strong light used, for example, in a liquid crystal display, thus improving reliability.

Furthermore, this invention provides a polarizing plate having a desirable extinction ratio in the visible light region. In addition, by employing inorganic material having a durability higher than organic materials used in conventional technologies, the present invention can meets the needs of high light-fastness against strong light such as a light used in a liquid crystal projector, thus realizing a reliable polarizing plate.

Figures 3, 4:
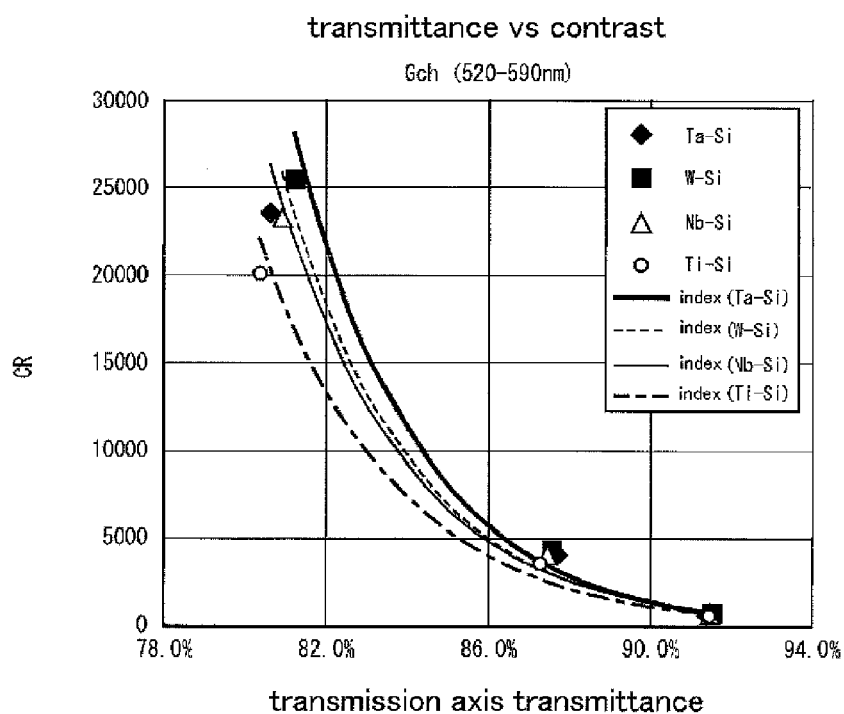
FIG. 3 is a table showing optical properties of various materials constituting a diffusion barrier layer.
FIG. 4 is a graph showing correlation characteristics between transmittance and contrast of polarizing elements using various materials constituting a diffusion barrier layer.
Figure 5:
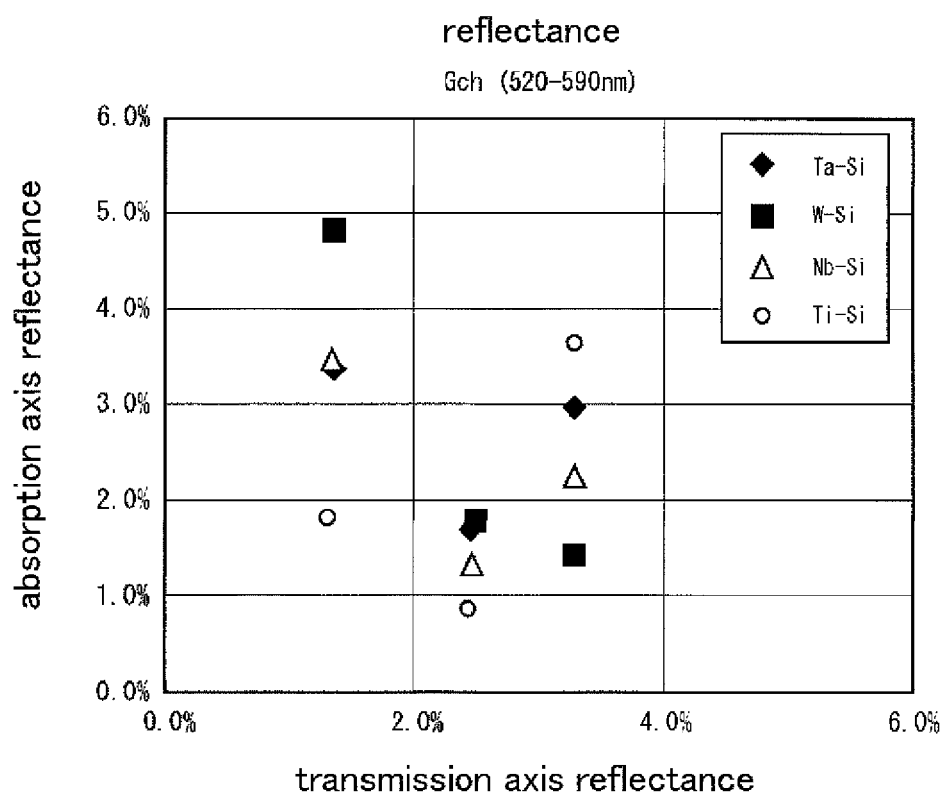
FIG. 5 is a graph showing correlation characteristics between transmission axis reflectance and absorption axis reflectance of polarizing elements using various materials constituting a diffusion barrier layer.

It should be noted that the polarizing element 1 can exhibit similar optical property in any case of using above-mentioned W, Ta, Nb and Ti as the diffusion barrier layer 14. This is because any of W, Ta, Nb and Ti has a refractive index n and an extinction coefficient k approximate to those of Si constituting the absorbing layer 15 as shown in FIG. 3. FIG. 4 shows correlation characteristics between transmission axis transmittance and contrast of the polarizing element 1 in which the absorbing layer 15 of Si having a thickness of 20 nm and the diffusion barrier layer 14 having a thickness of 5 nm are formed against a light having a wavelength of 550 nm for every material of the diffusion barrier layer 14. On the other hand, FIG. 5 shows correlation characteristics between transmission axis reflectance and absorption axis reflectance under the same condition. Both simulation results reveal that similar level of optical properties including a low reflectivity, a high transmittance and a high contrast can be obtained by using any of W, Ta, Nb and Ti. Moreover, any of W, Ta, Nb and Ti shows an excellent diffusion barrier property against Si constituting the absorbing layer 15.

2. Evaluation Test of Optical Property

Results of tests comparing the polarizing element 1 having the diffusion barrier layer 14 with a polarizing element not having the diffusion barrier layer 14 will now be explained. In each test, a practical example of the polarizing element having the diffusion barrier layer 14 and a comparative example of the polarizing element not having the diffusion barrier layer 14 were manufactured, and optical properties just after the manufacturing (initial optical properties), optical properties after a thermal process at 150° C. and optical properties after a thermal process at 300° C. were measured.

Figures explained below illustrate measured results of various optical properties, with the practical example of the polarizing element having the diffusion barrier layer 14 shown as Ta/Si and the comparative example of the polarizing element not having the diffusion barrier layer 14 shown as Si. The evaluation tests were conducted after making five or seven samples for both of the practical example and the comparative example.

In the polarizing element of the practical example, a dielectric layer ($SiO_2$: 35 nm), a reflective layer (Al: 200 nm), a dielectric layer ($SiO_2$: 12.5 nm), a diffusion barrier layer (Ta: 5 nm) and an absorbing layer (Si: 20 nm) were laminated on a transparent substrate (glass) in this order.

In the polarizing element of the comparative example, a dielectric layer ($SiO_2$: 35 nm), a reflective layer (Al: 200 nm), a dielectric layer ($SiO_2$: 12.5 nm) and an absorbing layer (Si: 25 nm) were laminated on a transparent substrate (glass) in this order.

Both of the practical example and the comparative example had a grid pitch of 148 nm. Moreover, both of the practical example and the comparative example were designed to achieve a high contrast and low reflectance in green range (around 500 nm), which is practically important in liquid crystal display devices.

Figure 6:
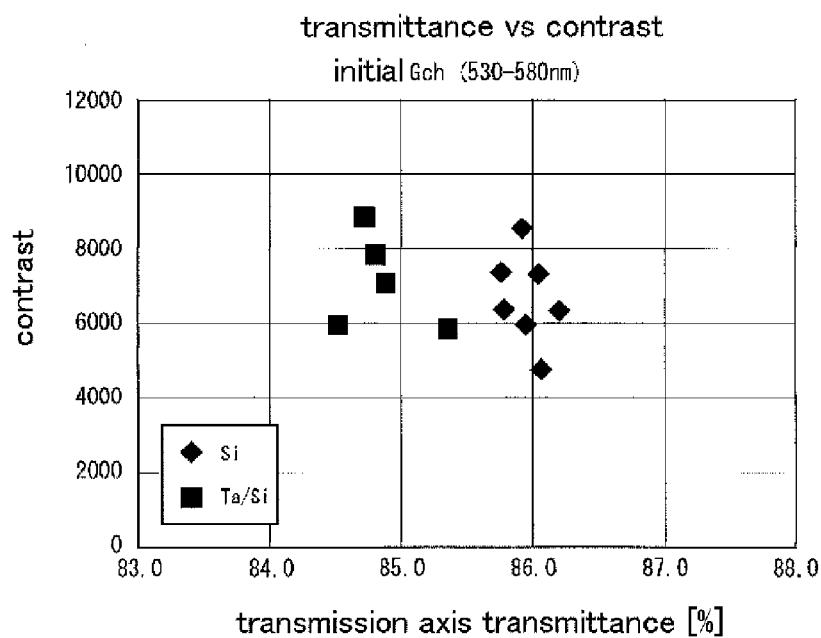
FIG. 6 is a graph showing initial correlation characteristics between transmittance and contrast of practical example and comparative example.
Figure 7:
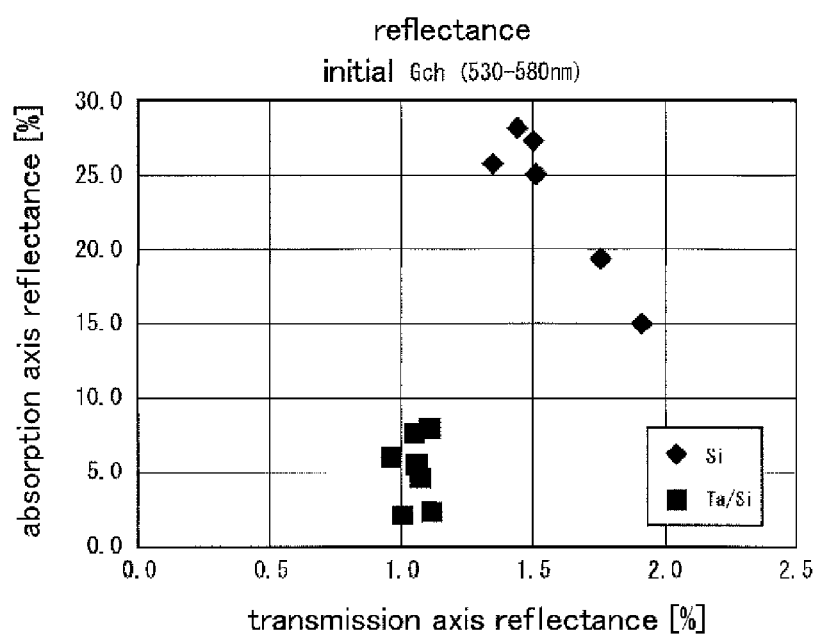
FIG. 7 is a graph showing initial correlation characteristics between transmission axis reflectance and absorption axis reflectance of a practical example and a comparative example.

FIG. 6 shows initial correlation characteristics between transmission axis transmittance and contrast, and FIG. 7 shows initial correlation characteristics between transmission axis reflectance and absorption axis reflectance. In polarizing elements exhibiting equivalent contrasts, ideal property is high transmission axis transmittance and low reflectance. The practical example has an advantage of low reflectance but has a disadvantage of low transmittance.

Figure 8:
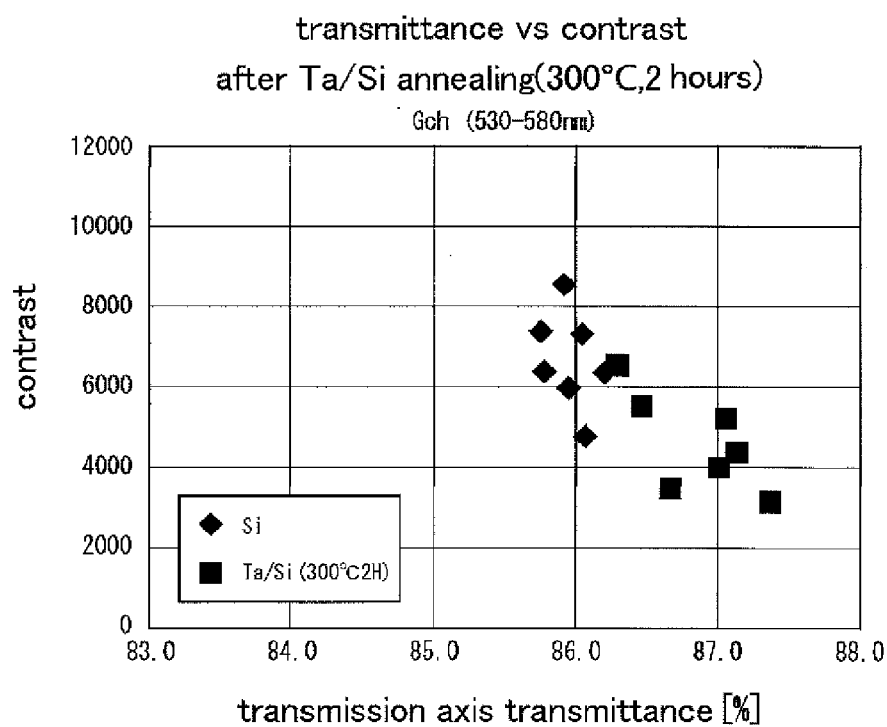
FIG. 8 is a graph showing correlation characteristics between transmission axis transmittance and contrast of a practical example after an annealing process and an initial comparative example.
Figure 9:
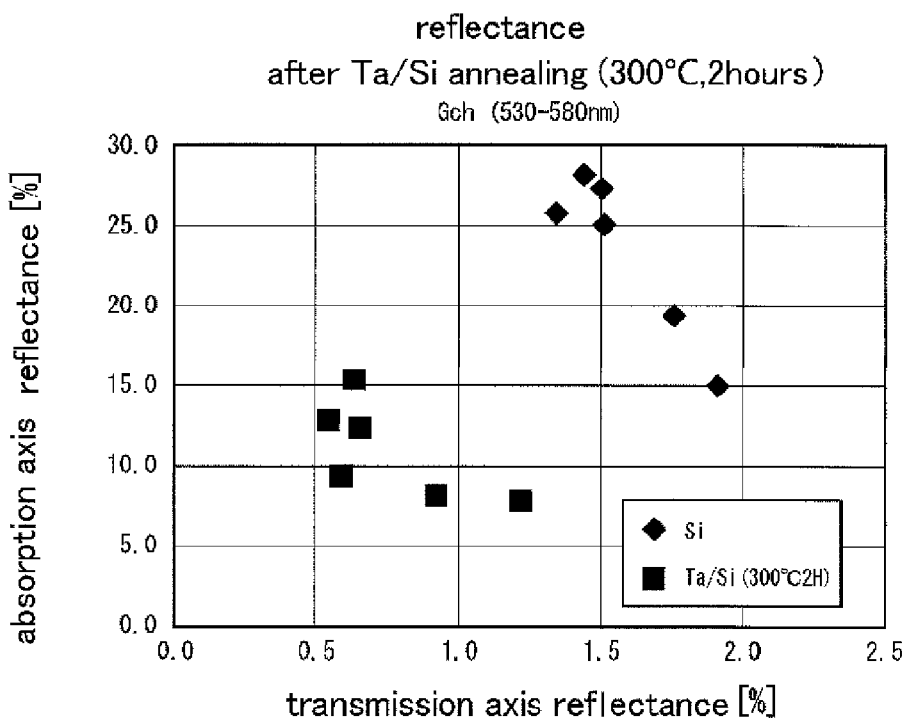
FIG. 9 shows correlation characteristics between transmission axis reflectance and absorption axis reflectance of a practical example after an annealing process and an initial comparative example.

To compensate this disadvantage, an annealing process was conducted at 300° C. for two hours to increase transmission axis transmittance. FIG. 8 shows correlation characteristics between transmission axis transmittance and contrast of the comparative example (Si) and the practical example (Ta/Si) after the annealing process, and FIG. 9 shows correlation characteristics between transmission axis reflectance and absorption axis reflectance. The practical example (Ta/Si) after the annealing process was able to achieve an ideal property of a high transmittance and a low reflectance.

Figure 10B:
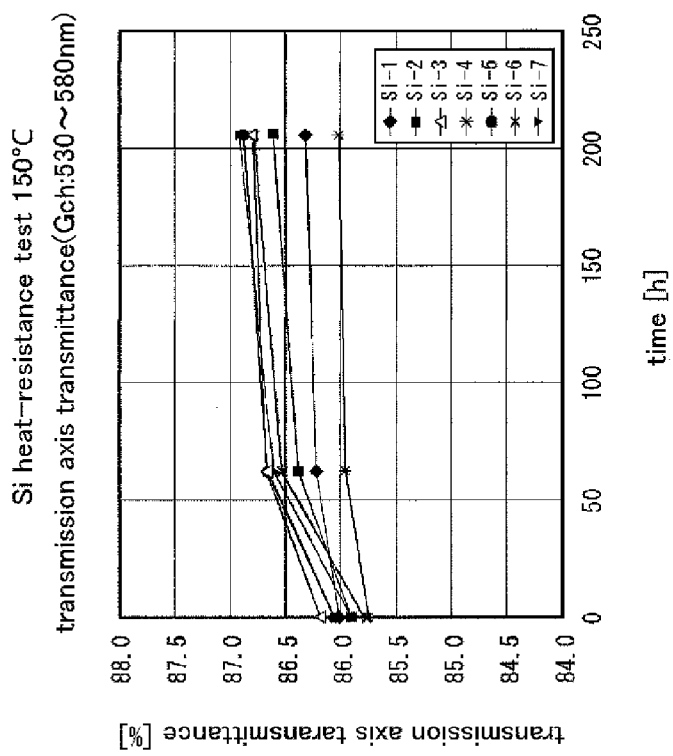
FIGS. 10A and 10B are graphs showing transition of transmission axis transmittances over time in a heat-resistance test at 150° C. of a practical example and a comparative example, respectively.
Figure 10A:
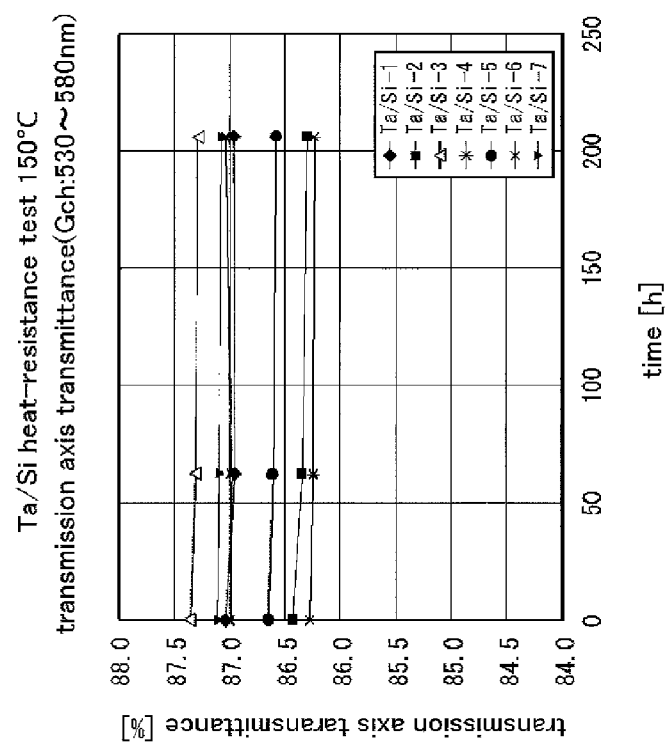
Figures 11A, 11B:
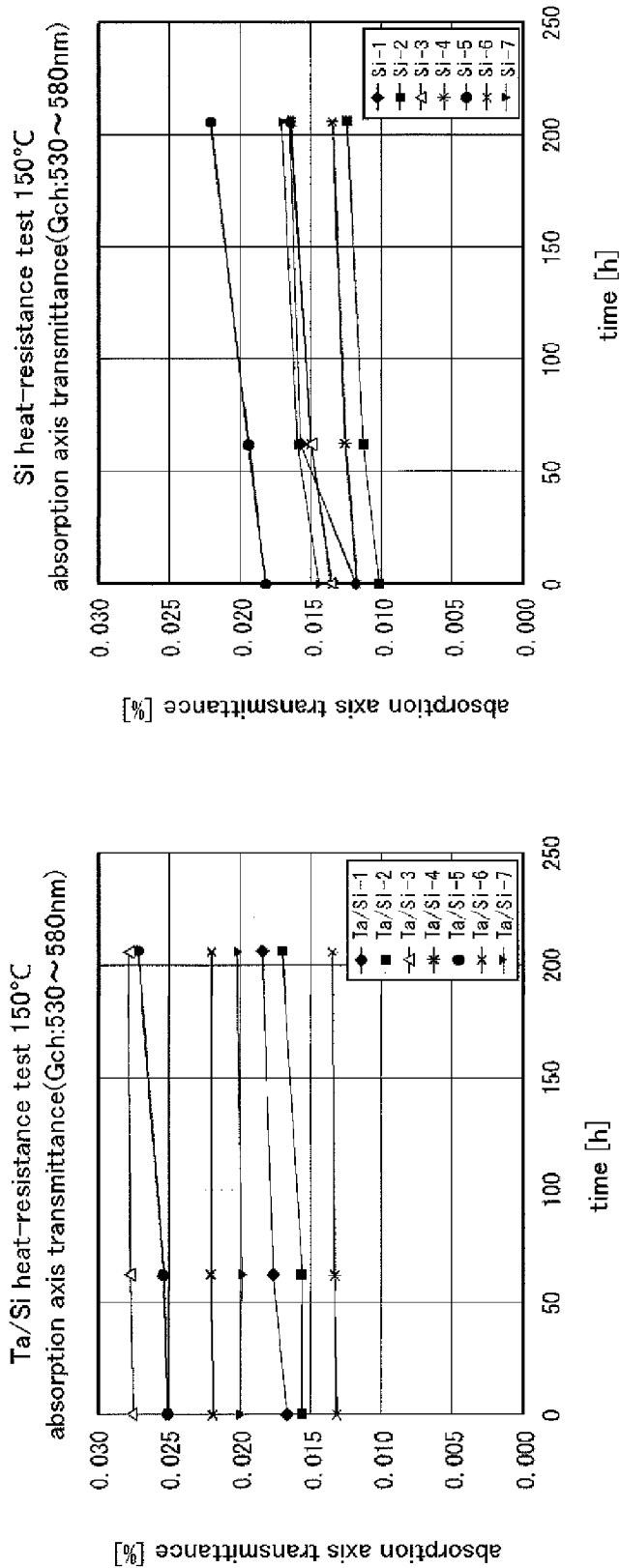
FIGS. 11A and 11B are graphs showing transition of absorption axis transmittances over time in a heat-resistance test at 150° C. of a practical example and a comparative example, respectively.
Figure 12B:
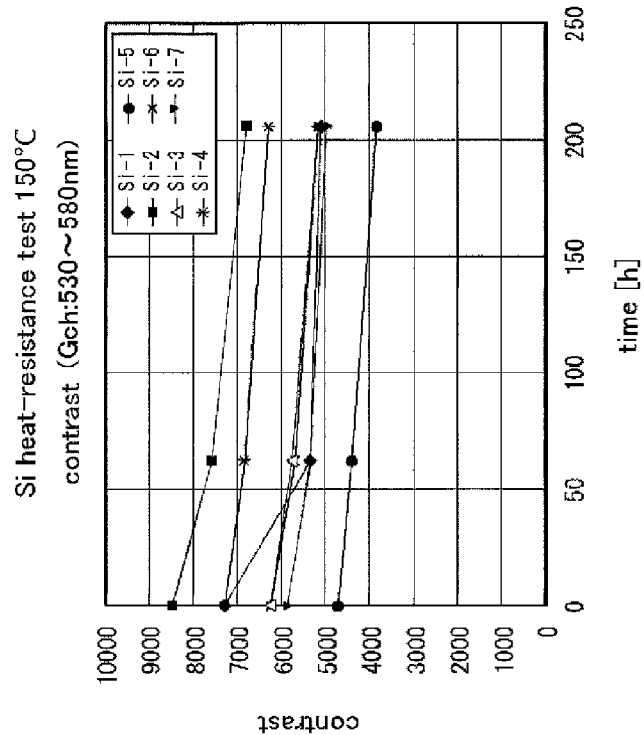
FIGS. 12A and 12B are graphs showing transition of contrasts over time in a heat-resistance test at 150° C. of a practical example and a comparative example, respectively.
Figure 12A:
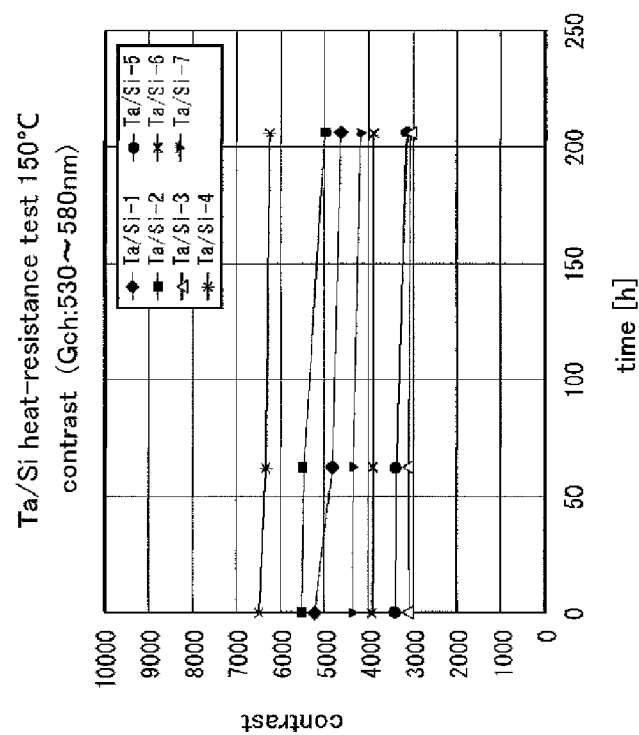
Figure 13B:
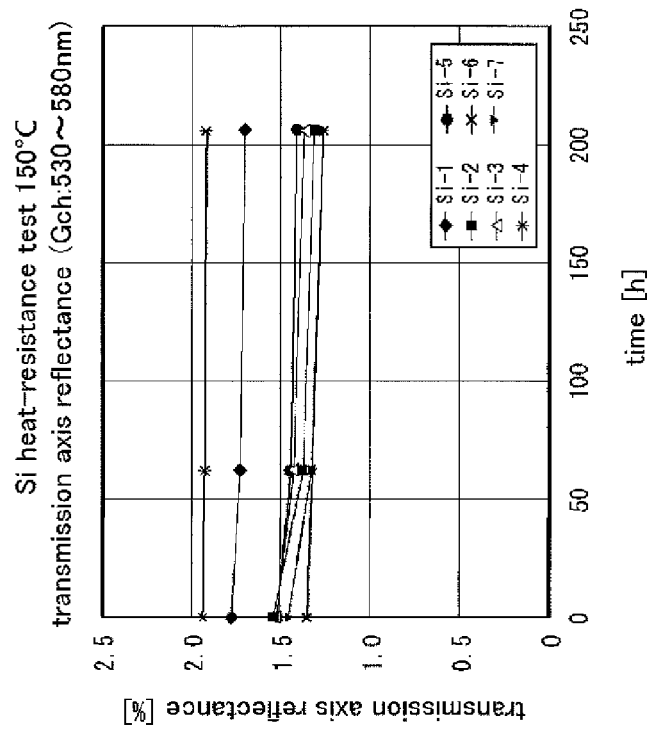
FIGS. 13A and 13B are graphs showing transition of transmission axis reflectances over time in a heat-resistance test at 150° C. of a practical example and a comparative example, respectively.
Figure 13A:
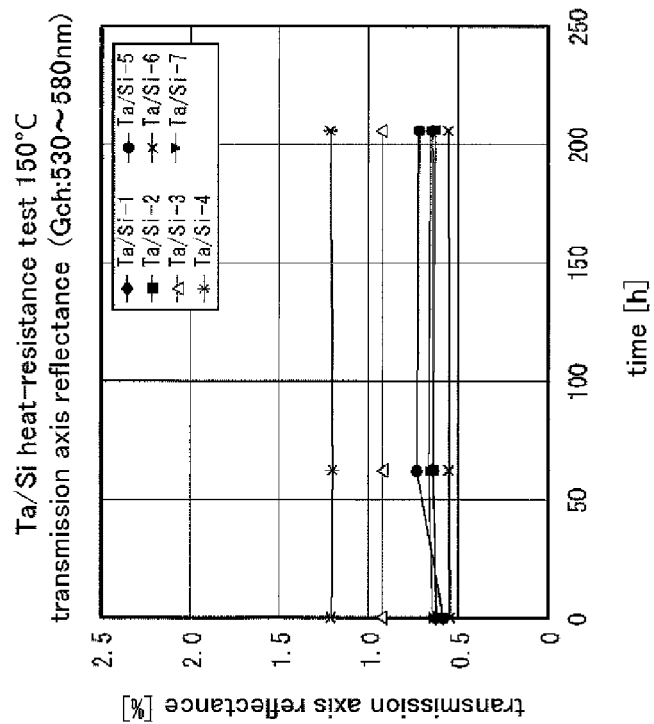

Next, heat-resistance tests were conducted at 150° C. on the polarizing elements of the practical example after the annealing process and the comparative example (Si). FIGS. 10A and 10B show transition of transmission axis transmittances over time in a heat-resistance test at 150° C. FIGS. 11A and 11B show transition of absorption axis transmittances over time in a heat-resistance test at 150° C. FIGS. 12A and 12B shows transition of contrasts over time in a heat-resistance test at 150° C. FIGS. 13A and 13B shows transition of transmission axis reflectances over time in a heat-resistance test at 150° C. FIGS. 14A and 14B shows transition of absorption axis reflectances over time in a heat-resistance test at 150° C. Note that FIGS. 10A, 11A, 12A, 13A and 14A are graphs of the practical example (Ta/Si) and FIGS. 10B, 11B, 12B, 13B and 14B are graphs of the comparative example (Si), plotted by measuring seven samples, respectively.

Although no significant difference was found on the transmission axis reflectances (FIGS. 13A and 13B), changes of all of the other properties were found to be smaller in the practical example (Ta/Si) having the diffusion barrier layer compared to the comparative example. This reveals that the polarizing element according to the present invention improves heat-resisting property by having the diffusion barrier layer. On the other hand, in the polarizing element of the comparative example having no diffusion barrier layer, the absorbing layer diffuses into the dielectric layer under a high temperature, causing a mixing of both layers and thus degrading the optical property of the polarizing element such as decrease in contrast.

3. Manufacturing Method of a Polarizing Element

A manufacturing method of a polarizing element 1 according to the present embodiment will be explained hereinafter with reference to FIGS. 15A to 15E. Firstly the reflective layer 12 (Al), the dielectric layer 13 (SiO$_2$), the diffusion barrier layer 14 (Ta), the absorbing layer 15 (Si), a first etching mask layer 20 (SiO$_2$) and a second etching mask layer 21 (Al) are deposited on the transparent substrate 11 in this order.

The reflective layer 12 is deposited by means of vapor deposition or spattering. More particularly, the deposition of the reflective layer 12 is conducted by positioning the transparent substrate 11 against a target and making argon particles to collide the target, such that the target material removed by the collision impact is deposited on the transparent substrate 11.

In addition, the dielectric layer 13, the diffusion barrier layer 14 and the absorbing layer 15 can be formed by a typical vacuum deposition method including sputtering method, vapor growth method and vapor deposition method, or sol-gel method (for example, a method in which a sol is coated by spin coating and then gelated by thermosetting). Alternatively, the diffusion barrier layer 14 and the absorbing layer 15 may be formed by depositing inorganic particles by means of glancing angle deposition (GLDA) method with vapor deposition or spattering utilizing shadowing effect.

Next, an anti-reflective coating 22 such as a BARC (Bottom Anti-Reflective Coating) and a photoresist 23 are formed, and then a grid-shaped mask pattern is formed by nanoimprint or lithography (FIG. 15A). FIGS. 15B to 15E illustrate a dry etching flow in the case of using photolithography for patterning.

Firstly, the anti-reflective coating 22 (BARC) and the second etching mask layer 21 (Al) are removed by dry etching (FIG. 15B), Etching gas usable in the dry etching of the anti-reflecting coating 22 (BARC) includes Ar/O$_2$. On the other hand, Cl$_2$/BCl$_3$ can be used for an etching gas for the second etching mask layer 21 (Al).

Next, the first etching mask layer 20 (SiO$_2$), the absorbing layer 15 (Si), the diffusion barrier layer 14 (Ta) and the dielectric layer 13 (SiO$_2$) are removed by dry etching (FIG. 15C). CF$_4$/Ar can be used as an etching gas for this etching.

Subsequently, the reflective layer 12 is removed by dry etching (FIG. 15D). Cl$_2$/BCl$_3$ can be used as an etching gas for this etching.

Finally, the first etching mask layer 20 (SiO$_2$) are etched by using CF$_4$/Ar gas. Optimizing the thickness of the first etching mask layer 20 (SiO$_2$) by etching can reduce the absorption axis reflectance (FIG. 15E). In addition, optimizing respective etching conditions (gas flow rate, gas pressure, power and cooling temperature of the substrate) will achieve a grid shape having a high verticality. The width (in X-axis direction) of the reflective layer 12 can also be adjusted by the etching conditions.

In the case when Al or AlSi is used for the reflective layer 12, materials capable of being etched by fluorine are preferably selected as materials for the absorbing layer 15 and the dielectric layer 13. This results in a high etching selectivity, thereby widening the range of film thickness design value of the reflective layer 12, which is advantageous in view of process construction.

Figure 16:
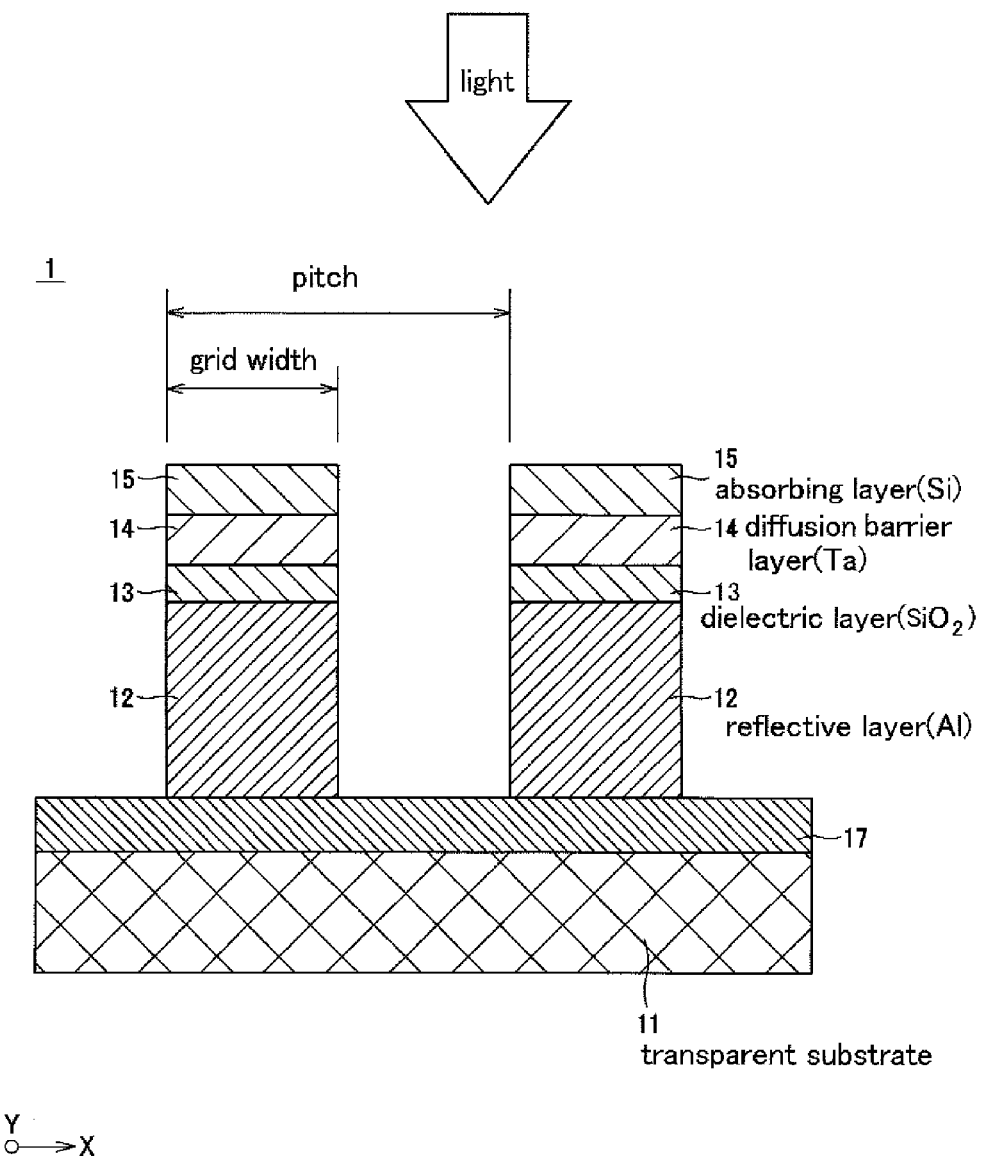
FIG. 16 is a cross sectional view of yet other polarizing element according to the present invention.

It is possible to deposit a protective film 16 such as an SiO$_2$ film on the top portion for improving reliability such as moisture resistance as long as the change of the optical property has no effect on practical use. Furthermore, as shown in FIG. 16, a transparent base film 17 of SiO$_2$ may be formed between the transparent substrate 11 and the reflective layer 12 in order to improve the transmittance.

Although above described process uses a two-layer etching mask formed of the first and second etching mask layers 20 and 21, the second etching mask layer 21 (Al) can be omitted by forming a grid-shaped mask pattern by nanoimprint or lithography to achieve higher productivity.

It should be noted that, in the case of using Al or AlSi for the material of reflective layer 12 that is etched by chlorine-based gas, it is preferable to select materials with high reactivity to fluorine and low reactivity to chlorine for forming the dielectric layer 13, the diffusion barrier layer 14, the absorbing layer 15 and the etching mask layers 20 and 21. This is advantageous in view of process construction since this selection can simplify the etching process, improve productivity and easily achieve a grid shape having a high verticality.

4. Exemplary Constitution of a Liquid Crystal Projector

A liquid crystal projector according to the present invention will be explained hereinafter with reference to FIG. 17. A liquid crystal projector 100 comprises a lamp as a light source, a liquid crystal panel and the above-described polarizing element 1.

Figure 17:
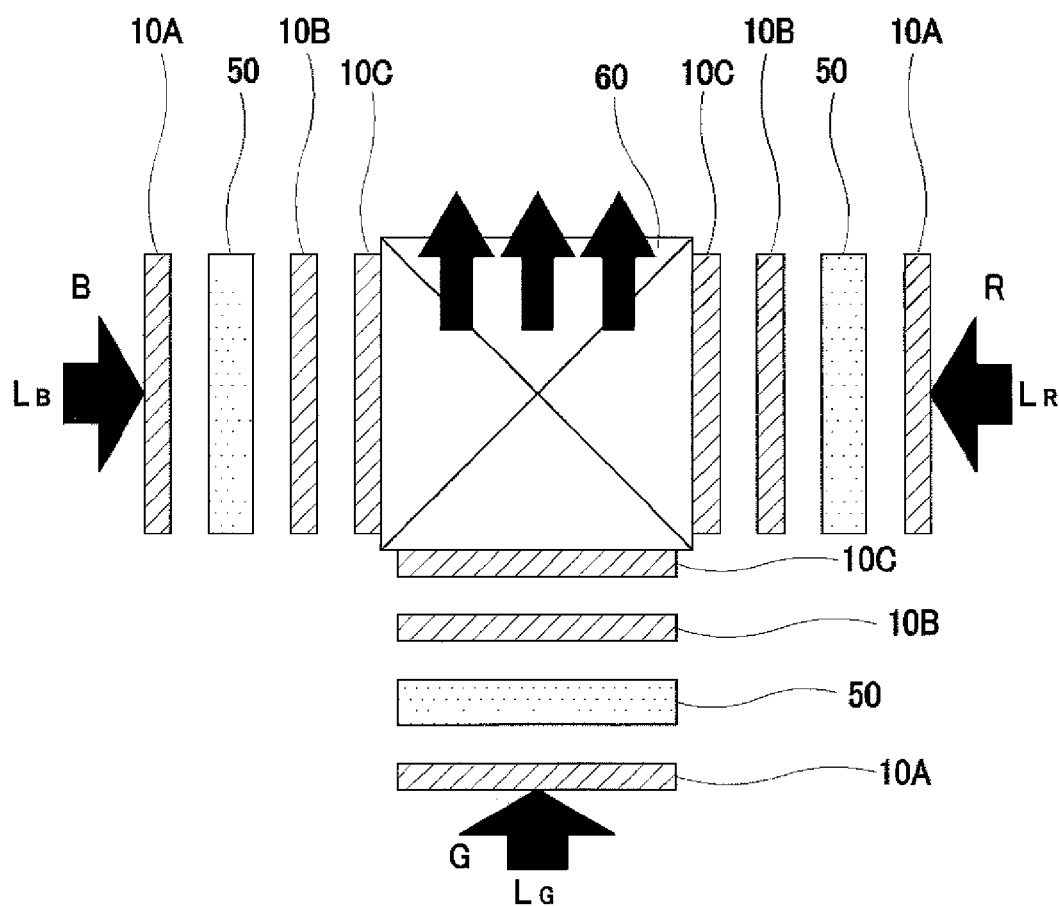
FIG. 17 is a schematic cross sectional view of an optical engine part of a liquid crystal projector according to an embodiment of the present invention.

FIG. 17 shows an exemplary configuration of an optical engine of the liquid crystal projector according to the present invention. The optical engine of the liquid crystal projector 100 comprises an input-side polarizing element 10A, a liquid crystal panel 50, an output-side pre-polarizing element 10B and an output-side main polarizing element 10C for red light LR, an input-side polarizing element 10A, a liquid crystal panel 50, an output-side pre-polarizing element 10B and an output-side main polarizing element 10C for green light LG, an input-side polarizing element 10A, a liquid crystal panel 50, an output-side pre-polarizing element 10B and an output-side main polarizing element 10C for blue light LB, and a cross dichroic prism 60 for combining lights output from the respective output-side main-polarizing elements 10C and outputting the combined light to a projector lens. It should be noted that the above-described polarizing element 1 is applied to each of the input-side polarizing elements 10A, the output-side pre-polarizing elements 10B and the output-side main polarizing elements 10C, thereby receiving light in used bandwidth from the light source at the side close to the transparent substrate 11 and transmitting the light.

This liquid crystal projector 100 has a constitution which separates light output from a light source lamp (not shown) into red light LR, green light LG and blue light LB at a dichroic mirror (not shown), inputs them into the respective input-side polarizing elements 10A corresponding to the respective lights, and then spatially modulates the lights LR, LG and LB polarized by the respective input-side polarizing elements 10A at the liquid crystal panels 50. The lights output from the liquid crystal panels 50 traveled through the output-side pre-polarizing elements 10B and the output-side main polarizing elements 10C are combined at the cross dichroic prism 60 and then projected from a projector lens (not shown). By using the polarizing element 1 having an excellent light-fastness against strong light, even when a high power light source lamp is used, the projector guarantees high reliability.

It should be noted that the polarizing element according to the present invention is not limited to be used in the above-described liquid crystal projector, but can be applied to any polarizing elements that are exposed to heat in their operating environments. For example, the polarizing element can be applied to a polarizing element for liquid crystal displays of car navigation systems or instrument panels of automobiles.

What is claimed is:

1. A polarizing element comprising:
a transparent substrate;
a reflective layer constituting, on the transparent substrate, grid-shaped convexities arrayed at a pitch smaller than a wavelength in a used optical bandwidth;
a dielectric layer formed on the reflective layer;
a diffusion barrier layer formed on the dielectric layer; and
an absorbing layer formed on the diffusion barrier layer such that the diffusion barrier layer is sandwiched between the absorbing layer and the dielectric layer, wherein
the diffusion barrier layer is formed of a material selected from the group consisting of Ta, W, Nb and Ti.

2. The polarizing element according to claim 1, wherein the absorbing layer is formed of Si.

3. The polarizing element according to claim 2, wherein the diffusion layer is an annealed layer.

4. The polarizing element according to claim 1, wherein a width of the reflective layer is more than 50% of the width of the dielectric layer.

5. The polarizing element according to claim 4, wherein the diffusion layer is an annealed layer.

6. The polarizing element according to claim 1, wherein the diffusion layer is an annealed layer.

7. A projector comprising:
a polarizing element according to claim 1;
a light source; and
an image display panel, wherein
the polarizing element receives light in a used optical bandwidth from the light source at a side of the transparent substrate on which the grid-shaped convexities are formed and transmits the light.

8. A method of manufacturing a polarizing element, comprising steps of:
preparing a transparent substrate;
forming a reflective layer on the substrate;
forming a dielectric layer on the reflective layer;
forming a diffusion barrier layer on the dielectric layer;
forming an absorbing layer on the diffusion barrier layer; and
forming a wire grid arrayed at a pitch smaller than a wavelength in a used optical bandwidth by patterning at least one of the laminated reflective layer, the dielectric layer, the diffusion barrier layer and the absorbing layer, wherein
the diffusion barrier layer is formed of a material selected from the group consisting of Ta, W, Nb and Ti.

9. The method according to claim 8, wherein the absorbing layer is formed of Si.

10. The method according to claim 9, further comprising a step of conducting an annealing process after forming the wire grid.

11. The method according to claim 8, wherein a width of the reflective layer is more than 50% of the width of the dielectric layer.

12. The method according to claim 8, further comprising a step of conducting an annealing process after forming the wire grid.

13. A polarizing element comprising:
a transparent substrate;
a reflective layer constituting, on the transparent substrate, grid-shaped convexities arrayed at a pitch smaller than a wavelength in a used optical bandwidth;
a dielectric layer formed on the reflective layer;
a diffusion barrier layer formed on the dielectric layer; and
an absorbing layer formed on the diffusion barrier layer such that the diffusion barrier layer is sandwiched between the absorbing layer and the dielectric layer, wherein
the absorbing layer is formed of Si.

14. A polarizing element comprising:
a transparent substrate;
a reflective layer constituting, on the transparent substrate, grid-shaped convexities arrayed at a pitch smaller than a wavelength in a used optical bandwidth;
dielectric layer formed on the reflective layer;
a diffusion barrier layer formed on the dielectric layer; and an absorbing layer formed on the diffusion barrier layer such that the diffusion barrier layer is sandwiched between the absorbing layer and the dielectric layer, wherein the diffusion barrier layer is an annealed layer.

15. A method of manufacturing a polarizing element, comprising steps of:

preparing a transparent substrate;
forming a reflective layer on the substrate;
forming a dielectric layer on the reflective layer;
forming a diffusion barrier layer on the dielectric layer;
forming an absorbing layer on the diffusion barrier layer; and
forming a wire grid arrayed at a pitch smaller than a wavelength in a used optical bandwidth by patterning at least one of the laminated reflective layer, the dielectric layer the diffusion barrier layer and the absorbing layer, wherein
the absorbing layer is formed of Si.

16. A method of manufacturing a polarizing element, comprising steps of:

preparing a transparent substrate;
forming a reflective layer on the substrate;
forming a dielectric layer on the reflective layer;
forming a diffusion barrier layer on the dielectric layer;
forming an absorbing layer on the diffusion barrier layer;
forming a wire grid arrayed at a pitch smaller than a wavelength in a used optical bandwidth by patterning at least one of the laminated reflective layer, the dielectric layer, the diffusion barrier layer and the absorbing layer; and
conducting an annealing process.

* * * * *